June 25, 1935.  J. D. MORGAN  2,006,205
EXHAUST GAS ANALYZER
Filed Sept. 16, 1930  2 Sheets-Sheet 1

Inventor
JOHN D. MORGAN
By his Attorney
Edmund G. Borden

June 25, 1935.  J. D. MORGAN  2,006,205
EXHAUST GAS ANALYZER
Filed Sept. 16, 1930   2 Sheets-Sheet 2
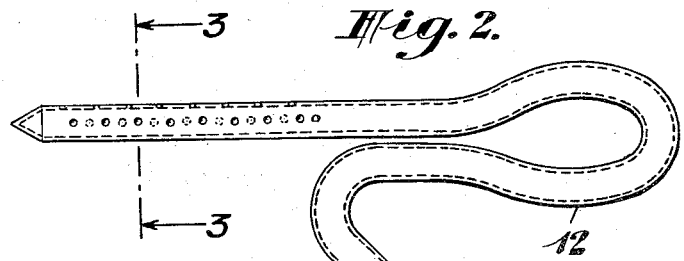
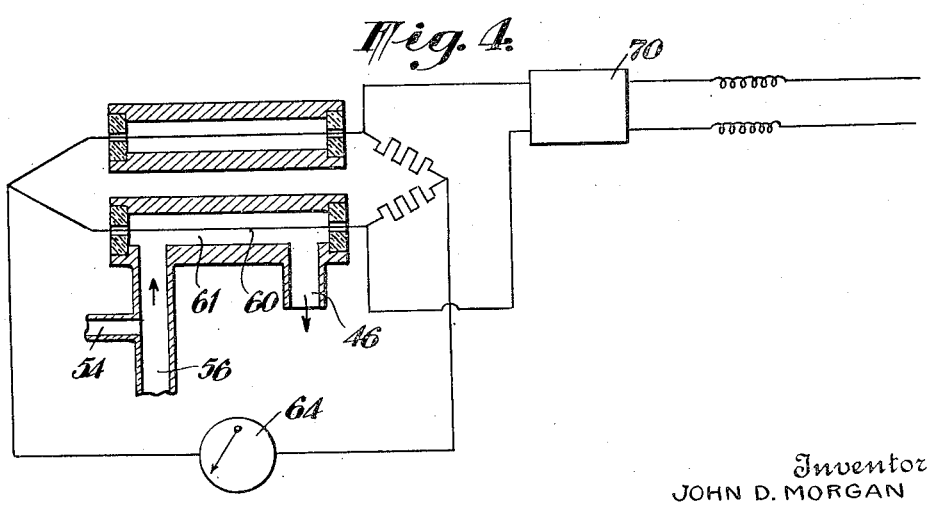
Inventor
JOHN D. MORGAN
By his Attorney
Edmund G. Borden Patented June 25, 1935

2,006,205

UNITED STATES PATENT OFFICE 2,006,205

EXHAUST GAS ANALYZER

John D. Morgan, South Orange, N. J., assignor to Doherty Research Company, New York, N. Y., a corporation of Delaware Application September 16, 1930, Serial No. 482,283

1 Claim. (Cl. 23—255)

This invention relates to an instrument designed to aid in the carbureter and spark adjustment of internal combustion engines and has for its principal object to provide an instrument which will give a quick, continuous, dependable determination of the quantity of combustible constituents in the exhaust gases of the engine while the same is in operation, so that the air-fuel ratio and spark setting may be adjusted for maximum power and economy.

Devices have long been known for determining the presence of small quantities of combustible constituents in a stream of gases such as the flue gases of a furnace by continuously withdrawing a sample of the gas, burning the same while passing through an ignition apparatus and measuring the resulting increase in temperature through its effect upon the electrical resistance of a heated wire. The information so obtained has enabled the fireman to obtain better combustion by the proper adjustment of the draft and dampers.

It has long been desired to apply this principle to the regulation of internal combustion engines to enable the operator to so adjust the carbureter and spark as to obtain the most complete combustion of fuel that is practicable. The efforts to apply this principle to an internal combustion engine have failed, however, due to the fact that the products of combustion passing through the exhaust manifold change radically in pressure with changes of load or speed of the engine, and also due to the fact that the temperature of the products of combustion is likewise subject to extreme changes with any change of load or speed of the engine, so that the portion of the gas which is continuously withdrawn for analysis differs considerably in quantity and temperature with any such change. These changes in quantity or temperature necessarily affect the analyzing instrument causing an erroneous reading. Furthermore, the dirtiness of the sample soon impedes the continuity of the operation.

It is an object of this invention to provide a continuous determination of the unburned constituents of the exhaust of internal combustion engines which will not be subject to changes in pressure or temperature of the gases passing therethrough and which will give accurate and continuous readings of the proportions of combustible constituents in the products of combustion so that the operator may be able to adjust the carbureter and the timing of the spark in such a manner as to obtain the least possible combustible residue in the exhaust gases consistent with maximum power and economy.

It is a further object of this invention to provide an instrument of the type described which will be so simple in operation that it may be set up in service stations, garages and the like and operated by the average mechanic therein available without the aid of a skilled chemist.

These and other objects of the invention will be apparent from the following detailed description in connection with the accompanying drawings in which:

Fig. 2 is a detail of a sampling tube used in connection with the invention;

Fig. 3 represents a section taken on line 3—3 Fig. 2, and

Fig. 4 is a diagrammatic view illustrating the electrical connections between the gas tester and the indicator.

Figure 1:
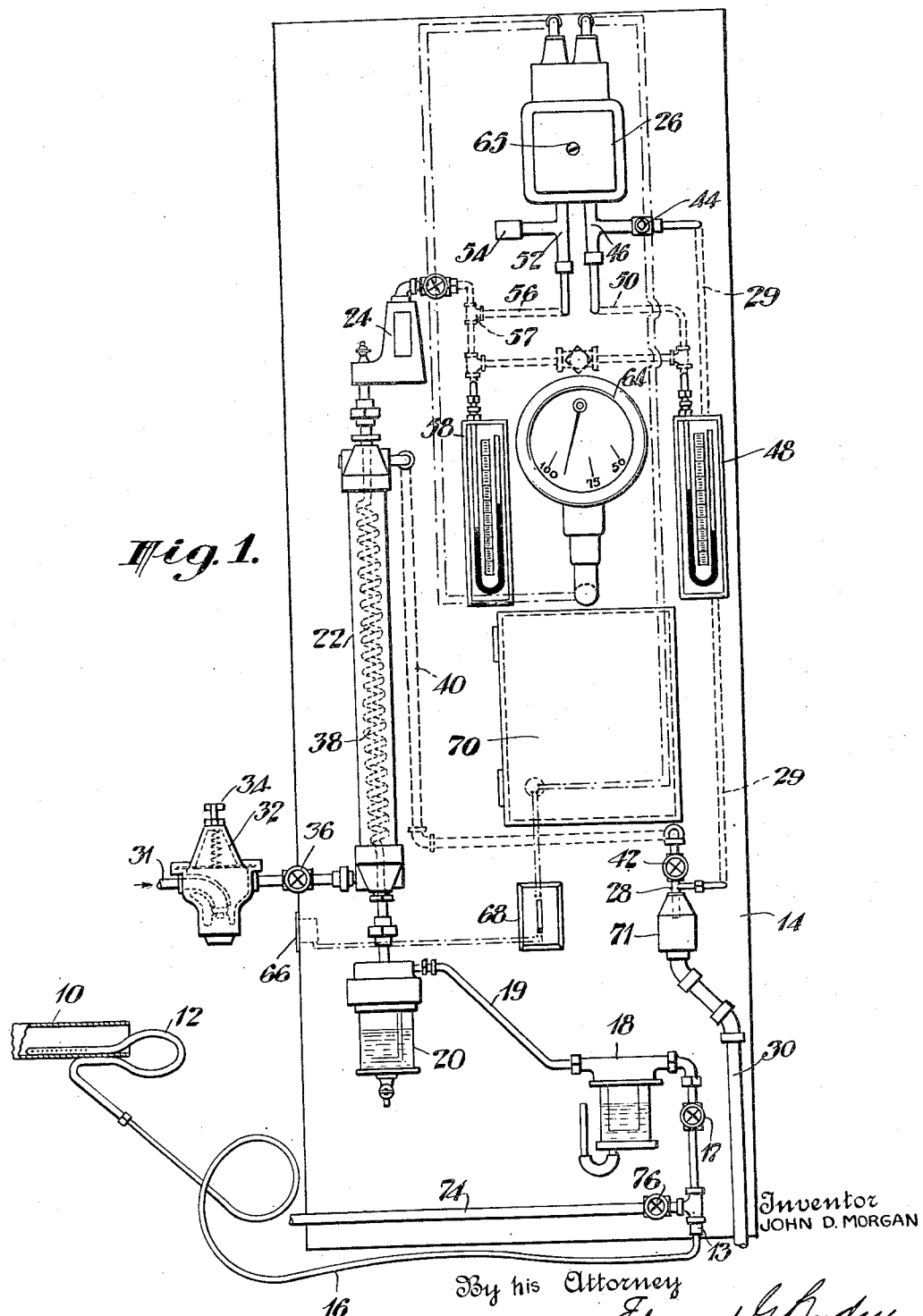
Fig. 1 is a front elevation of a panel upon which are mounted the instrumentalities comprised in the present apparatus as they appear in a practical layout, certain elements positioned behind the panel or otherwise invisible being indicated in dotted lines.

Referring particularly to Fig. 1, reference numeral 10 indicates a portion of an exhaust manifold of an internal combustion engine into which a sampling tube 12, which will be hereinafter more particularly described, is adapted to be inserted. The sampling tube 12 is connected by means of flexible metallic tubing 16 to a suitable pipe 13 mounted on panel 14. The pipe 13 is controlled by a globe valve 17 and leads to a relief valve and water separator 18. Copper tubing 19 connects relief valve 18 with an oil filter 20 which is in turn connected, by way of a cooler 22 and a second filter 24 to a tester 26, the essential elements of which will be hereinafter described in connection with Fig. 4. An aspirator 28 is connected to the discharge side of the tester by means of tubing 29 and exhausts into a discharge pipe 30.

Water at constant pressure is supplied to aspirator 28 by a pressure regulator 32. Pressure regulator 32 is adapted to so regulate the flow of water regardless of any changes in pressure in the water main with which it is connected by pipe 31, that a given constant pressure will be applied to the system for any given adjustment of the adjusting screw 34. A shut-off valve 36 is provided in the connections between the pressure regulator 34 and the cooler 22.

It will be seen that the same water which is used to cool the gases passing through the coil 38 in the cooler 22 passes by way of tubing 40 to the aspirator 28, thereby performing the two functions of cooling the gases and maintaining a constant suction throughout the testing system. A globe valve 42 is preferably provided in the tubing 40 just above the aspirator 28. The extent of the negative pressure produced by the aspirator 28 through the tubing 29 may be controlled by an adjustment valve 44 which controls the passage leading to the discharge side of the tester 26.

The discharge connection from the tester 26 is in the form of a T 46, one arm of which connects with the tester 26, the other arm of which is connected to a manometer 48 by way of tubing 50, and the stem of which terminates in adjusting valve 44. The intake side of the tester 26 is likewise formed of one arm of a T connection 52, the stem 54 of which constitutes an additional air inlet and the other arm of which is connected by way of copper tubing 56 to T 57 the arms of which connect with a manometer 58 and a filter 24.

In operation the sampling intake 12 is inserted in the exhaust pipe of the engine. This sampling tube is closed at the end as may be more particularly seen in Fig. 2, and has holes drilled in the top and sides but not in the bottom, so as to take products of combustion from the exhaust pipe 10, but avoid water and dirt which tend to flow along its bottom. These holes in conjunction with a Venturi orifice 21 so muffle the pulsating pressure occurring in the exhaust pipe 10 that the pressure beyond the sampling tube 12 is substantially constant. By thus having a constant quantity of exhaust gas a more reliable indication can be made of the completeness of combustion.

The gas sample obtained through 12 passes to the indicating apparatus through the heat resistant flexible tubing 16 to the relief valve and water separator 18 wherein certain of the entrained water is deposited. From 18 the gas sample passes to the oil filter 20, wherein it is scrubbed, thence through coil 38 of the cooler 22, wherein it is cooled to a constant temperature to insure uniform volume at uniform temperature for analysis. From the cooler 22 the gas sample passes through a main filter 24 preferably filled with mineral wool. Herein any untrapped dust, carbon, water vapor, oil and the like are taken out. From the filter 24 the gas sample passes by way of tubing 56 to the tester 26.

In the tester 26 the gas sample arriving through the passage 56 is mixed with additional air admitted through air inlet 54 and the combustible constituents thereof are burned with said air when the same contacts with an electrically heated wire 60 which forms one branch of a Wheatstone bridge shown diagrammatically in Fig. 4. The resulting combustion increases the temperature of the heated wire 60, thereby unbalancing the circuit and causing a current to flow through a galvanometer indicator 64. An adjusting screw 65 is provided on the tester 26 which controls the current through the Wheatstone bridge, enabling the operator to so balance the same that indicator 64 registers 100 when no combustible constituents are present in the gases passing through ignition chamber 61. The galvanometer is calibrated to read directly in completeness of combustion in general in accordance with the following table:

| Per cent of combustibles by volume CO—H$_2$—CH$_4$ | Per cent completeness of combustion |
|---|---|
| 0. | 100 |
| 1.4 | 93 |
| 2.4 | 90 |
| 3.1 | 87 |
| 5.6 | 84 |
| 16.5 | 65 |
| 22.2 | 49 |

The current from the usual lighting system is supplied to the apparatus by way of a plug receptacle 66, which is mounted in panel 14, and a switch 68 to a control rectifier box 70. The control box 70 is of the character now well known as a radio "A" eliminator being equipped with a resistance control when a line current is employed so that variations in voltage in the main line do not cause variations in voltage in the D. C. voltage supply to the instrument.

After passing through the ignition chamber 61 in contact with wire 60, the gases are drawn through aspirator 28 to drain pot 71 of discharge pipe 30.

The flow of the air and gas sample in a uniform manner is secured by adjusting the suction pressure so that, for example, manometer 58 shows one inch and manometer 48 shows 5 inches, thereby indicating a difference of 4 inches between the intake and the discharge sides of the tester. Similarly readings of two (2) inches and six (6) inches in the respective manometers likewise resulting in a pressure difference of 4" constitute a proper adjustment of the pressure through the system which is maintained for any given adjustment of the screw 34 of the constant pressure water regulator 32, so that water at a definite rate is supplied to the aspirator 28. This in conjunction with the uniform gas flow at constant temperature supplied by sampler 12 and cooler 22 insures correct readings at all times under all engine speeds. I have found it essential that the testing be done with uniform samples both as to the air admitted for combustion, the temperature of the ignition wire 60 and temperature and volume of the gas samples.

In order to keep the sampling line clear a pipe 74 connecting with a source of compressed air controlled by a valve 76 opens into the pipe 13 below the valve 17. Valve 17 is closed after each test and valve 76 is opened to admit compressed air for clearing hose 16 and sampling tube 12.

From the above disclosure it will be seen that the present invention provides a device capable of giving quick, accurate and continuous determinations of the quality of combustion occurring in an internal combustion engine in such a manner as to enable the operator to set the carbureter and spark while observing the effect of such adjustment directly in terms of completeness of combustion.

Although there has been herein described a specific embodiment of the invention it will be obvious to those skilled in the art that various modifications may be made in the details of construction and in the design and proportion of the several cooperating parts without departing from the principles herein set forth.

Having thus described the invention, what is claimed as new is:

A gas analyzer device for use in regulating combustion in an internal combustion engine, comprising a perforated sampling tube adapted to be inserted in the exhaust manifold of the engine, orifice means for muffling pulsating pressure in the exhaust gas removed by said tube from said manifold to substantially constant pressure, a cooler adapted to cool a hot gas stream of variable temperature to a uniform low temperature, a gas filtering element, a gas-air mixer having an air inlet, a continuous analyzer incorporating as one branch of a Wheatstone bridge an electric wire igniting element together with means for supplying current under constant voltage thereto, and means for determining by measurement of current flow through the wire the presence of combustible constituents in the exhaust gas passing thereover, and mechanism for causing gas to flow in succession through said sampling tube, muffling means, cooler and filtering element, and thence in admixture with a constant amount of added air at a uniform rate through said mixer and over said igniting element.

JOHN D. MORGAN.